United States Patent [19]

Gilson

[11] 4,093,159

[45] June 6, 1978

[54] SEMI-AUTOMATIC AIRCRAFT CONTROL SYSTEM

[75] Inventor: Richard D. Gilson, Columbus, Ohio

[73] Assignee: The Ohio State University Research Foundation, Columbus, Ohio

[21] Appl. No.: 775,384

[22] Filed: Mar. 7, 1977

[51] Int. Cl.² ............................................. G05D 1/12
[52] U.S. Cl. .................................. 244/187; 73/178 T; 340/407; 364/434
[58] Field of Search .................... 35/10.2, 12 E, 12 F, 35/DIG. 2; 73/178 R, 178 T; 235/150.2, 150.22; 244/181, 183–188, 196, 197, 83 E; 340/27 R, 27 AT, 27 SS, 407

[56] References Cited

U.S. PATENT DOCUMENTS

| | | | |
|---|---|---|---|
| 2,478,967 | 8/1949 | Greene | 340/27 SS |
| 2,754,505 | 7/1956 | Kenyon | 340/407 |
| 2,816,724 | 12/1957 | Snodgrass | 244/197 X |
| 3,418,458 | 12/1968 | Majendie | 244/187 X |
| 3,945,593 | 3/1976 | Schänzer | 235/150.2 X |

Primary Examiner—Stephen G. Kunin
Attorney, Agent, or Firm—Sidney W. Millard

[57] ABSTRACT

A flight control type system which provides a tactile readout to the hand of a pilot for directing elevator control during both approach to flare-out and departure maneuvers. For altitudes above flare-out, the system sums the instantaneous coefficient of lift signals of a lift transducer with a generated signal representing ideal coefficient of lift for approach to flare-out, i.e., a value of about 30% below stall. Error signals resulting from the summation are read out by the noted tactile device. Below flare altitude, an altitude responsive variation is summed with the signal representing ideal coefficient of lift to provide error signal readout.

25 Claims, 8 Drawing Figures

SEMI-AUTOMATIC AIRCRAFT CONTROL SYSTEM

The invention described herein was made in the performance of work under NASA Contract Number NAS-2-8954 and is subject to the provisions of Section 305 of The National Aeronautics and Space Act of 1958 (72 Stat. 434;42 USC2457).

BACKGROUND OF THE INVENTION

In the course of operating aircraft, the pilots thereof typically are called upon to react or respond to a number of dynamic conditions which concern phenomena the subject of which has long been analysed under theory of flight principles. It is generally recognized that such pilot activity becomes more intense at the commencement and termination periods of a given flight. For instance, during departures, attention is paid to achieving a best rate of climb, or a rate considered ideal where it is necessary to clear an obstacle near the runway. In this regard, proper aircraft control procedures ultimately stem from such theoretical considerations as airfoil lift, angle of attack and drag. Similarly, desirable landing procedures, particularly under shortfield landing conditions, require maintenance of the aircraft in an ideal attitude with respect to the above parameters.

In each of the above typical control situations, the aircraft is operated much closer to its aerodynamic stall condition than in other, cruise designated phases of flight, thus emphasizing a need for close concentration on the part of the pilot. Piloting an airplane during these critical periods additionally requires added levels of human information processing or attention by virtue of the responsibility of the pilot to react to a much higher frequency of air traffic and navigational information inputs. Accordingly, during the more critical phases, particularly take-offs and landings of any given flight, the concentration capabilities of the pilot are taxed to the highest extent.

Inasmuch as a significant number of fatal general aviation accidents have been found to be occasioned by aerodynamic stall/spin phenomena, both government and industry have sought remedial measures lessening pilot burden during operation of an aircraft under conditions close to stall speed.

In current general practice, control asserted over aircraft during typically slower speed departure and landing maneuvers has been predicated upon readout information gleened from the airspeed indicator, the pilot being called upon to correlate a particular flying situation with aircraft manufacturer recommended airspeeds. Such recommended speeds are considered to vary with a variety of aspects including the gross weight of the aircraft, best rate and angle of climb on take-off, desired glide path, maneuvering on landing, angle of bank, flank setting final approach techniques and the like. As is apparent, this form of control direction during slower speed maneuvering is not entirely desirable. Looking momentarily to the general theory involved in considering such slower speed flight, recourse usually is made to the interrelationships of the coefficient of lift, $C_L$, coefficient of drag, $C_D$, and angle of attack AOA, in defining the performance of a given aircraft. The coefficient of lift is represented by the formula:

$$C_L = \frac{L}{\frac{1}{2} \rho S V^2},$$

where L is lift, $\rho$ is air density, S is the area of the wing airfoil and V is the velocity or air speed at the airfoil in question.

Similarly, the coefficient of drag, $C_D$, is represented by the formula:

$$C_D = \frac{D}{\frac{1}{2} \rho S V^2},$$

where D, is drag. The angle of attack for any given aircraft is measured as the angle between relative wind and the chord of its wing. This chord, for each wing configuration or airfoil condition, is considered to extend from the forwardmost leading edge of the wing airfoil to the farthest extent of the trailing edge.

In practice, the coefficients of lift and drag are plotted or compared against angle of attack for a given airfoil to derive desired lift/drag conditions. Generally, such comparisons will reveal that the coefficient of lift increases with angle of attack to a maximum value or curve inflection point. As angle of attack is increased beyond that maximum value, however, incipient stall conditions are encountered wherein rapid increases in drag develop and the corresponding values for coefficient of lift drop rapidly. Accordingly, operation of an aircraft at a condition near stall during commencement and termination of a flight will be at an angle of attack within a selected region short of the inflection point of the coefficient of lift curve. In practice, about a thirty percent factor of safety is recommended for such operation.

As is apparent, a continuous informational input to the pilot as to the value of actual angle of attack compared with the value thereof at a stall condition is of considerable control value. In this regard, techniques for deriving such informational inputs have been derived. For instance, a vane has been attached to the wing or fuselage of an aircraft to generate a continuous angle of attack information signal. However, the treatment of such signals to derive a valid relationship between vane-measured angle of attack and the corresponding angle at a stall condition necessarily is complex. Any alteration in the airfoil configuration for instance, as is occasioned with various degrees of flap deflection or, perhaps through the assertion of parasitic drags with the lowering of landing gear and the like, alters the chord orientation defining angle of attack and/or alter the coefficient of lift characteristic of the airfoil. In consequence, determination of a revised stall angle of attack is necessitated with each slight change of airfoil configuration. Systems have been evolved which accommodate to this variable through the use of onboard computers which correlate flap position and the like with apparent angle of attack to compute stall angle of attack. However, systems generally are too elaborate for utilization at the levels of aircraft expenditure found in most general aviation aircraft.

Another form of sensor which avoids the need for a combination of vane and computer to provide stall angle of attack information is conventionally referred to as a "lift transducer" and is described, inter alia, in U.S. Pat. Nos. 3,486,722; 3,437,292; and 3,361,393. The lift transducer is described as measuring the relative location of the airflow stagnation point at the leading edge of a wing airfoil. For instance, as such leading edge addresses an airflow i.e., relative wind, certain of that flow will go over and certain of the flow will go under the wing to form a pressure area defined as the noted stagnation point. As the angle of attack of the airfoil changes through the introduction of flaps or the like as well as changing aircraft attitude, this stagnation point moves correspondingly either forward or aft on the leading edge of the wing. By measuring such relative movement with respect to a given location, signal values corresponding with actual and stall angles of attack can be derived.

As is apparent, each of the disclosed systems seeks to generate an aerodynamic flight condition signal which, in effect, is a function of the instantaneous value of angle of attack or coefficient of lift and supplies some form of perceptible readout to the pilot during lower speed flight.

From the foregoing, it may be observed that a desirable lift director system for aircraft will provide information to a pilot as to optimum aircraft attitude during those lower speed maneuvers wherein the aircraft is operated near to a stall condition. This information is desired for achieving best rate or angle of climb following departure as well as during landing approaches. In the latter regard, such information desirably will permit approaches to be carried out under short field conditions as well as avoid stall conditions during directional maneuvers such as the turn from downwind or base leg.

Another aspect of such lift control is concerned with the final stage of descent for landing wherein the aircraft is "flared-out" to progressively reach a full-stall attitude at the point of touchdown. During this maneuver, the pilot is called upon to introduce a progressive variation of aircraft attitude in order to gradually reach the above noted full-stall attitude. This maneuver has been observed to be one of particular difficulty on the part of novice or beginning pilots. A director system assuring optimum transition during this phase in addition to the above will serve to significantly enhance both the quality and safety of landings. Similar difficulties have been witnessed during a corresponding phase of flight wherein the aircraft reaches the velocity for rotation during take-off role. Hereagain the pilot is called upon to commence a maneuver wherein an important progressive alteration of attitude of the aircraft is inserted. It has been observed that pilots in training or novice pilots experience some difficulty in achieving appropriate progressive attitude control during such maneuvers.

As noted above, during the critical, terminal phases of a flight the frequency of information supplied the pilot is increased to a relatively high level. Accordingly, where possible, such information should be asserted in as high an assimilatory fashion as possible to avoid the danger of confusion.

SUMMARY OF THE INVENTION

The present invention is addressed to a flight or lift control type system which provides attitude command input information to a pilot throughout substantially all lower speed aircraft flight maneuvers. By continuously asserting such command information during all slow speed flight phases, the pilot is afforded the opportunity of maintaining an aircraft attitude optimized with respect to an ideal coefficient of lift condition. Such command information is available to the pilot not only during initial climb following departure as well as along the initial approach glide path, but also throughout final descent from the point of commencing flare-out to touchdown. With the system, substantially all landings advantageously may be well controlled and, if desired, undertaken for short-field landing conditions with optimized control.

Another aspect and object of the invention is to incorporate with the above system, a display arrangement wherein directing information is asserted via a kinesthetic-tactile readout device. Incorporated, for example, within the control yoke of the aircraft, director information is asserted upon the hand of the pilot, thereby freeing the pilot's visual perceptive capabilities for accommodation to other, simultaneously received control aspects and the like, e.g. runway lineup requirements. As a consequence, the pilot is afforded the opportunity of consistently carrying out high quality landings under operating conditions of improved safety. Such a tactile display or readout arrangement is described, for instance, in U.S. Pat. No. 3,478,351.

As indicated above, the readout device may be configured incorporating a control head or housing which forms a portion of the control yoke or stick normally gripped by the pilot. Within the control head or housing is moveably mounted a tactile slide which is driven forwardly or rearwardly by a servo-motor or the like. The slide is driven forwardly from an orientation wherein its end surfaces are flush with the surface of the control head to provide a command to the pilot to move the yoke forwardly to lessen the attitude of the aircraft airfoil and, conversely, is driven rearwardly to command the pilot to increase attitude by pulling the yoke rearwardly. Continuous proper aircraft attitude is maintained during the noted slow speed maneuvers by moving the yoke to maintain the tactile slide in an orientation wherein its end surfaces are flush with the control head.

A further object of the invention is to provide a flight or lift control system for producing a command input to a pilot representing control correction required to derive an optimum attitude for an aircraft during the rotation and climbout phase of departure as well as corresponding lower speed approaches and including flare-out and through touchdown. The system incorporates a transducer means coupled with the aircraft which is responsive to the instantaneous aerodynamic airfoil status of the aircraft and derives an output signal, $V_A$, which corresponds with lift-related instantaneous angle of attack of the airfoil. The system further incorporates a first signal generator which derives a signal of fixed value, $V_D$, which in turn corresponds with a derived and substantially high coefficient of lift and/or angle of attack for the airfoil during approach to flare-out and departure maneuvers. The measurement of height from, for instance a radar altimeter, is incorporated with the system to derive an output signal of value, $h$, which varies in correspondence with the absolute altitude of the aircraft. Additionally a second signal generator is provided which derives a predetermined signal of fixed value, A. This signal value corresponds with an altitude selected from commencing flare-out performance for the aircraft. A summing network is coupled to receive the predetermined fixed signal of value, A, and the altimeter output signal of value, $h$, for deriving an altitude responsive output signal of value corresponding with the expression, $A-h$, when the aircraft is at or below an altitude corresponding with the signal of value, A. Another or second summing network is provided which responds to the transducer output signal of value, $V_A$, and the first signal generator signal of fixed value, $V_D$, when the aircraft is above an altitude corresponding with the commencement of flare-out. This second summing network derives a control error signal from these inputs having a value designated, $V_C$, in correspondence with the expression: $V_C = V_D - V_A$. For the purposes of generating a control from flare-out through touchdown, the comparator network further generates a signal below the altitude represented by the value A, to derive a control error signal in correspondence with the expression: $V_C = V_D - V_A + (A - h)\beta$, where $\beta$ is an empirically determined calibrating constant for the system. A display arrangement responsive to the control error signal, $V_C$, then provides a perceptible and continuous indication of correction required for affording the pilot a capability of continuously establishing an attitude and performance for the aircraft during the noted maneuvering procedures predetermined as ideal with respect to coefficient of lift and angle of attack.

Another object and feature of the invention is to provide the above-noted transducer arrangement as a sensor-transducer which may be located in the vicinity of the leading edge of a wing airfoil of the aircraft and has an output of the earlier described value, $V_A$ which corresponds with the site of the stagnation point aerodynamically generated on the airfoil. With such an installation, the above-noted first signal generator output signal of value, $V_D$, may be considered to correspond with a predetermined situs of a stagnation point representing an ideal lift condition.

Another desirable feature of the invention resides in its relatively simple configuration as compared with currently available systems, thereby lending its utility to the general aviation market.

Another object of the invention is to provide a flight control system of the above variety wherein the display or readout arrangement is provided incorporating a control housing having opposed surface portions and mounted so as to be gripped by the hand of the pilot controlling an aircraft. A tactile slide is movably mounted within this control housing and is actuable to move outwardly from one of the surfaces to exert a perceptible tactile effect upon a portion of the hand of the pilot. A d.c. servo-motor is connected to actuate the tactile slide when energized. Additionally, a potentiometer arrangement is associated with the slide and motor having an output which corresponds to the position of the tactile slide with respect to the control housing. A control circuit arrangement for driving the motor is provided including an input summing stage or point for receiving the potentiometer output as well as the control error signal of the sensing system. The circuit derives a difference signal from the input and energizes the servo-motor in correspondence with that difference signal. Preferably, the control circuit feedback network, extending from the potentiometer to the input or summing point of the circuit, provides for a simultaneous assertion of the potentiometer input through a d.c. coupling or direct coupling as well as a differentiating network so as to provide an anticipatory form of performance—to avoid "hunting" effects and the like.

Other objects of the invention will, in part, be obvious and will, in part, appear hereinafter.

The invention accordingly, comprises a system and apparatus possessing the construction, combination of elements and arrangement of parts which are exemplified in the following detailed disclosure.

For a fuller understanding of the nature and objects of the invention, reference should be had to the following detailed description taken in connection with the accompanying drawings.

DETAILED DESCRIPTION

Figure 1:
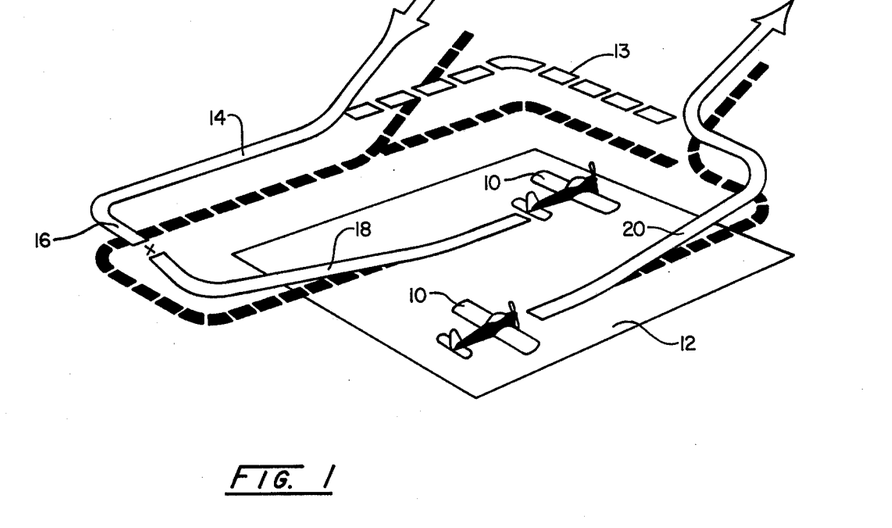
FIG. 1 is a pictorial and exaggerated representation of a runway showing conventional approach and departure flight patterns.

Referring to FIG. 1, a representation of a somewhat standard traffic pattern revealing landing and departure maneuvers is depicted. At the commencement of any given flight, an aircraft as at 10 is taxied to the selected take-off position upon runway 12. With appropriate clearance, power is applied and the aircraft 10 moves along runway 12 until achieving a desired take-off air speed from which condition it proceeds to fly and commence initial climb as along path 20. During this maneuver, the aircraft leaves the runway and preferably ascends under lift conditions predetermined as ideal or desired, such conditions generally requiring maximum power and best attitude. Commonly, climbing turns are carried out for traffic control purposes upon reaching a designated altitude.

Within an airport traffic pattern, the aircraft may be flown along a flight path designated an "upwind leg" which follows a path parallel to the landing runway in the direction of landing. Such a flight path generally terminates to commence a "cross wind leg" 13 which is a flight path at right angles to the landing runway off its takeoff end, while a "downwind leg" is a flight path parallel to the landing runway in the direction opposite to landing. The latter downwind leg is represented in FIG. 1 at 14. From cruise, entrance to the downwind leg 14 generally is carried out at about a 45° angle, again depending upon inputs from traffic control functions. At the termination of the downwind leg, a "base leg" is flown which, as designated at 16, is a flight path at right angles to the landing runway off its approach end and extending from the downwind leg to the intersection of the extended runway center line. From the base leg, the aircraft is turned to a final approach which, as designated at 18, is a flight path in the direction of landing along the extended runway center line from the base leg to the runway. In the course of performing the final approach, the pilot, at an altitude variable with the human factor and other conditions will commence flare-out procedures wherein the angle of attack of the aircraft is gradually increased until at touchdown, the attitude and coefficient of lift, representing a stall condition, is attained. Of course, variations in such patterns are made in response to the noted informational inputs supplied by traffic controllers or in accordance with the published charts or ground indications for individual airports.

The control system of the present invention is concerned with all the relatively slower speed operations of aircraft 10, e.g. within the traffic pattern during downward leg 14, base leg 16 and final approach 18. Additionally, the system inserts control commands to the pilot of the aircraft from the point of flareout e.g. at altitudes of about 50 feet, until touchdown. Further, the invention looks to providing an efficient rate-of-climb at and following take-off along path 20 as well as provides informational input to the pilot in the course of higher speed ground travel on the runway 12 during departure procedures.

Figure 2:
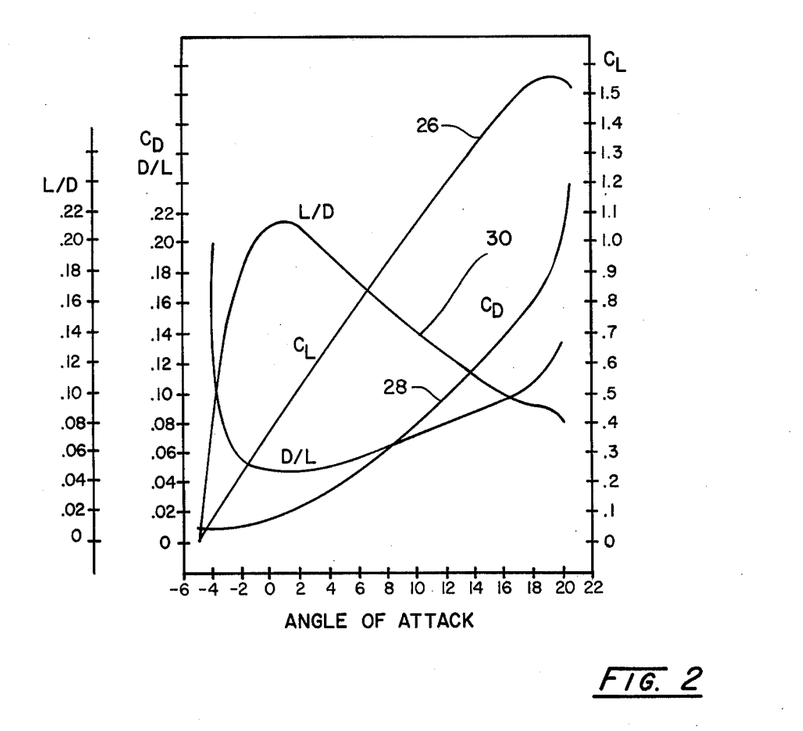
FIG. 2 is a representation of a typical wing section characteristic curve revealing coefficient of lift, coefficient of drag and L/D ratio curves with respect to values of angle of attack.

During the above-noted slower speed maneuvers of the aircraft, attitude control directions are carried out at angles of attack and air speeds nearer to a stall condition than in other phases of the flight. Accordingly, close attention on the part of the pilot is required in the interest of safety and performance. In this regard, reference is made to FIG. 2 wherein angle-of-attack is related to coefficient of lift and coefficient of drag for a typical airfoil. It should be understood that each aircraft will exhibit difference airfoil characteristics and these characteristics will vary in concert with any manipulation of the airfoil by movement of high lift devices such as flaps or perhaps through the imposition of parasitic drags as may be occasioned with the movement of landing gear and the like. Curve 26 of FIG. 2 is one plotting coefficient of lift, $C_L$, for a given airfoil and is observed to rise with increasing angle-of-attack until reaching a critical inflection point from which a rapid drop-off occurs. This is the point of commencement of an airfoil stall condition or an incipient stall condition and represents the maximum value for the coefficient which may be achieved. The corresponding coefficient of drag, $C_D$, is plotted at curve 28 and shows a gradually rising curve which assumes a steep configuration appropriately corresponding with the inflection or stall region of curve 26. As is apparent, the drag elevates rapidly as a stall condition is encountered. For landing maneuvers as described hereinabove, it is desirable that the airfoil assume an attitude or configuration evidencing a relatively high coefficient of drag in order to achieve a relatively steeper descent, while at the same time achieving an attitude exhibiting an angle-of-attack which provides a relatively high coefficient of lift value. Note that curves 26 and 28 both elevate in value as a stall angle of attack is approached. Accordingly, for landing maneuvers, aircraft will be operated under attitudes and conditions nearer to a stall attitude than in other phases of flight.

During such other phases of flight operations, a relatively low value of the ratio of the coefficient of lift to coefficient of drag is desired, this ratio conventionally being referred to as lift-to-drag ratio, L/D. As revealed at curve 30, optimum L/D ratios are achieved at relatively low angles of attack and coefficients of lift appropriate for cruise conditions of flight. However, particularly for landing maneuvers, the aircraft is operated at speeds and angles of attack near stall with appropriate account taken for a factor of safety. In this regard, a conventional arrangement with respect to speed is to provide about a 30 percent speed factor of safety over that speed representing an incipient stall condition for any landing configuration. This same general approach is taken with the control arrangement of the instant invention wherein a desirable coefficient of lift and coefficient of drag relationship is selected with due regard given for a factor of safety with respect to known stall conditions.

As discussed above, during that portion of final approach between flareout at relatively low altitude and touch-down, the angle of attack of the aircraft is gradually increased until such time as the aircraft touches the ground. Theoretically, at this point a full stall attitude will have been achieved to provide a smooth landing. An interesting parallel has been found to occur with regard to the corresponding maneuvers at the same altitude range during takeoff. For instance, commencing with lift-off, a desired rate of climb attitude is achieved through a continual variation of angle-of-attack corresponding with flare-out procedures. During climb maneuvers above the prejudged altitude corresponding with that normally selected for commencement of flare-out, the airfoil condition corresponds with that considered appropriate for downwind maneuvers to the commencement of flare-out. These two aspects of flight, however, generally involve different airfoil configurations. For instance, a flap or high lift device utilization defines the airfoil during landing procedures and, for conventional departures, such high lift devices are not used or are used in a different airfoil configuration. Notwithstanding these otherwise differing airfoil aspects a unique correspondence has been discovered with respect to aircraft attitude during nearground maneuvers, whether from the altitude corresponding with commencement of flareout to touchdown as from lift off to the same altitude, i.e., substantially all maneuvers within that altitude envelope have a common attitude aspect.

Figure 3:
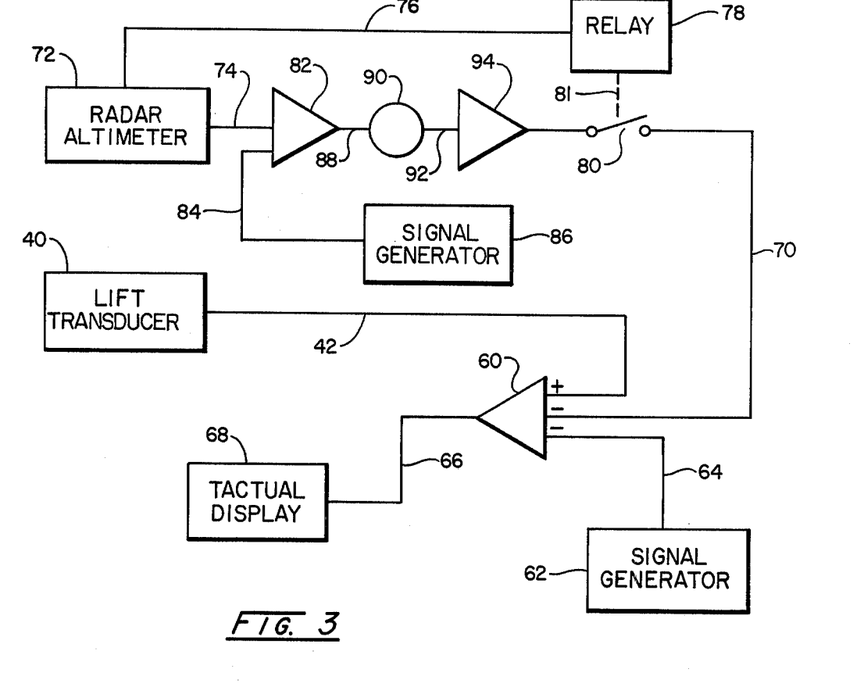
FIG. 3 is a schematic block diagram showing the interrelationship of the components of the system of the invention.
Figure 4:
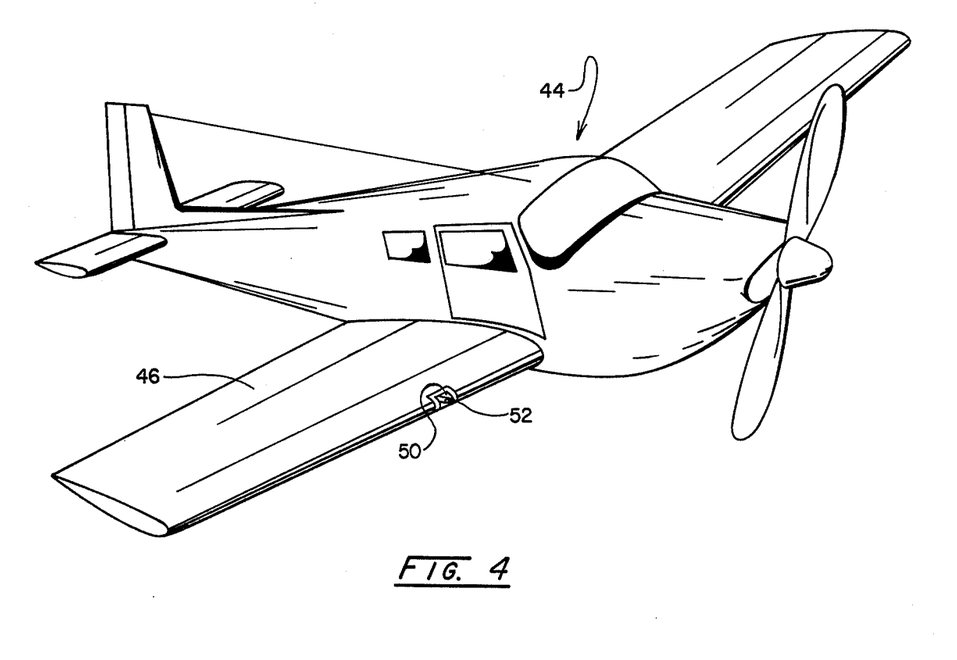
FIG. 4 is a pictorial representation of a portion of a wing airfoil showing a preferred sensor-transducer arrangement utilized with the invention.

Referring to FIG. 3, a block diagramatic representation of the system of the invention is revealed. In its preferred embodiment, the system utilizes a lift transducer represented by block 40. When activated, transducer 40 provides an output signal along line 42, designated, $V_A$, which corresponds with the site of the stagnation point aerodynamically generated upon the wing airfoil of the aircraft. As noted earlier herein, as a wing travels through the air it splits relative wind at the leading edge such that a pressure defined area, referred to as the noted stagnation point, is produced. This stagnation point is readily correlated to the lift condition of the wing, i.e., to angle-of-attack or coefficient of lift. With alterations in the airfoil profile, for instance through the use of high lift devices such as flaps an altered stagnation point location is produced to provide a correspondingly altered signal, $V_A$, at line 42. Marketed under the trade designation SC-150 by the Safe Flight Instrument Corporation, White Plains, New York, the lift sensor or transducer 40 is installed in the lower leading edge of an aircraft wing and incorporates a small blade or vane which responds to relative pressures. Looking momentarily to FIG. 4, aircraft 44 having a wing 46 is shown incorporating a small rectangular cut-out 50 from which extends the noted blade 52. Blade 52 moves with respect to the relative pressure above and below it to alter a Hall effect device and generate the noted output signal $V_A$, at line 42.

Returning to FIG. 3, this instantaneous signal $V_A$, is introduced to one input of a null or summing network 60. Network 60 also receives an input, $V_D$, of opposite polarity from a signal generator 62 through line 64. Signal generator 62 provides this output signal, $V_D$, correlated with a lift characteristic stagnation point or angle of attack value predetermined as desired or ideal for aircraft approach conditions. In this regard, coefficient of lift or angle-of-attack values selected about 30 percent from those representing a stall condition generally are considered desirable. For the arrangement shown, where any deviation exists between the signals at line 42 and line 64, network 60 generates a corresponding error signal designated, $V_C$, at line 66. This error signal, $V_C$, is introduced through line 66 to a display arrangement represented by block 68. Display 68 apprises the pilot of a necessary change in the pitch attitude of the aircraft to achieve any flight condition predetermined as desired or ideal. With the arrangement thus described, attitude director information is supplied for flying maneuvers at relatively slower speeds as occasioned e.g., during downwind approaches to the position of flare-out as well as for departures commencing with an altitude similar to that selected for the initiation of flare-out during landing procedures and extending to cruise altitude. Note that the same signals, $V_A$ and $V_D$ are commonly generated and utilized in a landing mode as well as a departure mode even though different airfoil aspects are present. As discussed hereinabove, high lift devices, such as flaps are a function of airfoil definition during landing and generally are not present during the above-designated climb operations.

The system further incorporates a control feature for achieving an ideal and varying aircraft pitch attitude from the commencement of flare-out to touchdown as well as from lift off through an altitude corresponding with that wherein flare-out is initiated during landing procedures. This input, introduced through line 70 to summing or null network 60, is an altitude responsive one and, accordingly, incorporates an informational input from a radar altimeter represented by block 72. Altimeter 72 is of conventional design and, for example, may be similar to that marketed as Model AA-200 by Sperry Flight Systems, a division of Sperry-Rand Corporation, Phoenix, Arizona. The output signal of altimeter function 72, designated, $h$, is present at line 74 and represents absolute altitude, i.e., altitude, above actual ground. Also extending from altimeter function 72 is a line 76 which receives and transmits a trip command signal upon the occasion of the aircraft reaching an absolute altitude of fixed value, designated, A, predetermined in corresponding with the altitude selected for commencing flare-out performance. This altitude will vary with the type of aircraft within which the system is installed and may, for example, be selected as about 50 feet. The trip command signal at line 76 continues as long as the aircraft is at an altitude equal to or less than, A, and serves to actuate a relay 78. Relay 78, in turn, is mechanically connected with a switch 80 as represented by dashed line 81. When so activated, relay 78 closes switch 80 and is biased to open switch 80 at such time as the aircraft is at an altitude above the preselected value, A. A conventional threshold circuit may be utilized for purposes of establishing the command signal at line 76. The absolute altitude signal at line 74, designated as having a value, $h$, is introduced to one input of a summing network 82. A second input to network 82 is provided from along line 84 from a signal generator 86. Generator 86 serves to provide a signal of a value corresponding with the noted absolute altitude, A. Although not shown, this signal designated for convenience as, A, also may be utilized in conjunction with altimeter function 72 to derive the trip command signal at line 76. The output of summing network 82 is present at line 88 and represents a difference signal having the value, $(A-h)$. The voltage signal at line 88 is proportionally diminished by a constant amount $\beta$ at 90 for compliance and calibration with the remainder of the system circuitry in conventional manner and introduced along line 92 to an inverter 94. The term, $\beta$, is identified hereinbelow. The output of inverter 94 is connected through switch 80 to input line 70 which, in turn, is coupled to the input of null network 60. The polarity of the diminished value, $A$-$h$, at line 70 is matched with the polarity of value, $V_D$, at line 64 and their sum is compared against the signal of value $V_A$ at line 42. Network 60 then performs a summation for flight conditions below altitude of value, A, in correspondence with the expression:

$$V_C = V_D - V_A + (A - h)\beta,$$

where, $\beta$, is an empirically determined calibrating constant.

This error signal of value $V_C$ along line 66, then is translated to perceptible information at display function 68. As alluded to earlier herein, it is preferred that the display function 68 be of a kinesthetic-tactile type. With such a display, the pilot's visual attention to control conditions may be enhanced while full control information is conveyed from the control yoke into the hand in the vicinity of the fingers and palm.

Figure 5:
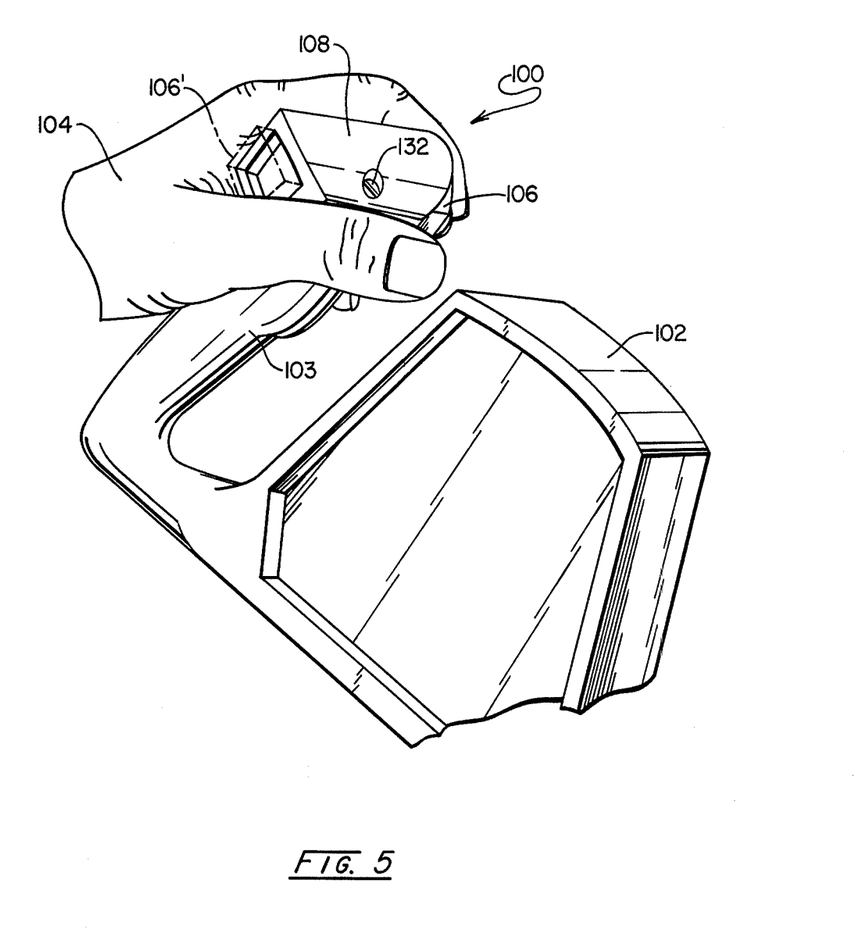
FIG. 5 is a pictorial representation of a conventional aircraft yoke showing a tactile display arrangement of the invention as operationally related to the hand of a pilot.

Referring to FIG. 5, a kinesthetic-tactile display is pictorially represented at 100 in an embodiment wherein it is incorporated within one arm of a typical aircraft yoke 102. The hand of a pilot 104 is shown grasping the arm of the yoke in conventional manner. Display 100 generally operates to position a tactile slide 106 transversely in correspondence with error signal, $V_C$. In this regard, note that the drawing shows slide 100 extending forwardly against the outer portion of the index finger of hand 104. As such, the slide is commanding the pilot to move the yoke 102 forward to thereby lessen the pitch attitude of the aircraft. As the yoke 102 is moved forward, the aircraft assumes a proper attitude and the slide 106 correspondingly moves rearwardly toward a flush position with the sides of its housing 108. Conversely, should the error signal, $V_C$, indicate an pitch attitude less than desired or ideal, slide 106 will extend to rearward orientations, one of which is shown at 106' in phantom in the figure. In this orientation, slide 106 will contact the upper portion of the palm between the thumb and index finger. By moving the yoke 102 rearwardly, the aircraft will assume a higher pitch altitude in correction and slide 106 again will retract. As the aircraft reaches a desired flight attitude, slide 106 gains a position wherein it is flush within housing 108.

Figure 6:
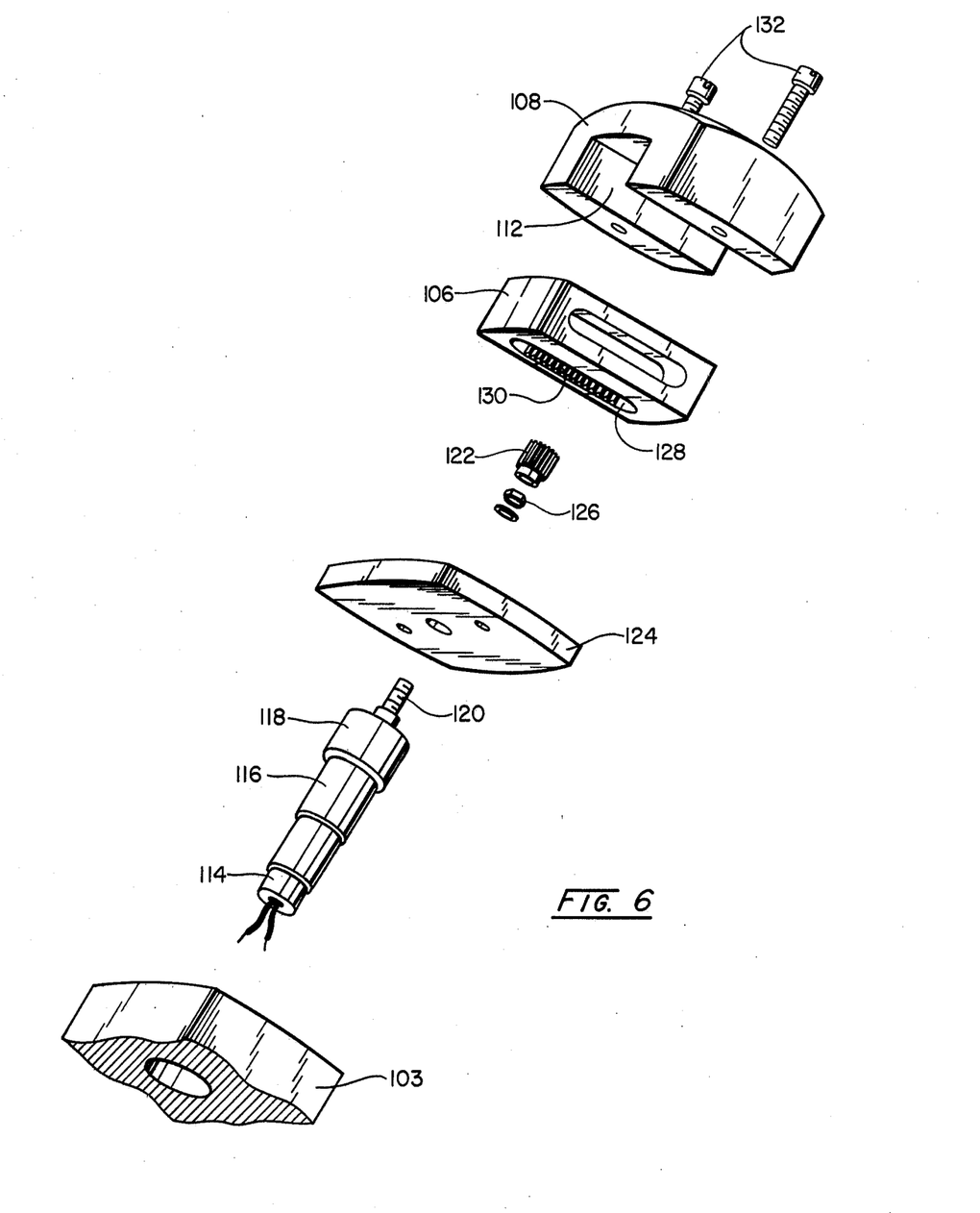
FIG. 6 is an exploded representation of the tactile read-out device of FIG. 5.

Looking additionally to FIG. 6, the components of display 100 are revealed in more detail. In this figure, it is seen that the housing 108 has an external configuration matching that of the opposite arm of yoke 102. The housing is formed incorporating a centrally disposed channel 112 of generally rectangular configuration. Within channel 112, tactual slide 106 is slideably nested and is configured to be moved by a rack and pinion drive assembly powered from a d.c. motor 114. As is revealed in more detail in FIG. 6, the drive output of motor 114 is connected with a reduction gear train 116, the output of which, in turn, is connected to a feed-back potentiometer 118. The drive output shaft of the assembly, shown extending from feed-back potentiometer 118 at 120, is coupled through a slip-clutch arrangement and bushing (not shown) to a pinion gear 122. Shaft 120 also extends through a mounting plate 124 upon which 122 is connected by locking nut 126. Slide 106 is configured having an elongated opening formed through the lower portion thereof to define a chamber 128 into which gear 128 extends. Further formed within chamber 128 is a rack 130, the teeth of which are engageable with the corresponding teeth of pinion gear 122. Accordingly, with appropriate directional rotation of shaft 120, pinion gear 128 is driven to move slide 106 transversely through channel 112 within housing 108. Mounting screws as at 132 extend through housing 112 and mounting plate 124 and into the arm 103 of yoke 102. Other tactile display arrangements may, for example, be provided as described in U.S. Pat. No. 3,478,351.

Figure 7:
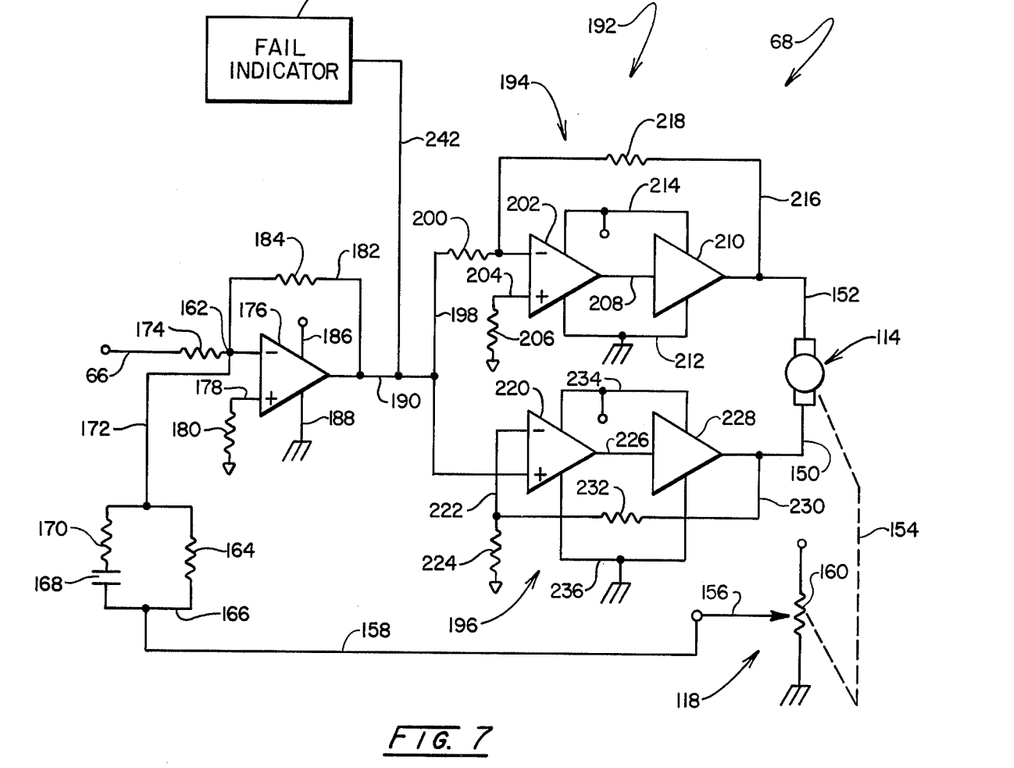
FIG. 7 is a schematic circuit diagram of the tactile display control function shown in FIG. 3.

Turning to FIG. 7, a schematic circuit diagram of tactual display function 68 as it is utilized to drive the display 100 is revealed. The figure shows d.c. servomotor 114 in schematic fashion connected between power input leads 150 and 152. The mechanical connection between motor 114 and potentiometer 118 is now represented by a dashed line 154 and the wiper component of potentiometer 118 is revealed at 156 in connection with line 158. Arm 156 is shown in movable contact with the schematically portrayed winding 160 of potentiometer 118, this winding extending between ground and the full voltage level of the power supply of the aircraft and, as will become apparent, having a neutral or null condition at its midpoint corresponding with a position of tactile slide 106 wherein the end portions thereof are flush with the corresponding side surfaces of housing 108.

The power input to the circuit of FIG. 7 is one derived from a power supply splitter network wherein an intermediate reference voltage is derived between ground and full voltage availability may be about 14 volts d.c., while the reference level would be one-half of that value or about 7 volts d.c. In the discourse to follow, the ground level is indicated by a ground symbol, the reference voltage level is represented by an arrowhead and the full voltage level input is represented by a small circle, in keeping with conventional practice.

With the imposition of a control or error input signal, $V_C$, at display input line 66, servo-motor 114 is energized in one direction or the other from lines 150 and 152 to, in turn, move the location of wiper 156 with respect to the midpoint of winding 160. A resultant voltage signal is asserted representing position change of tactile slide 106 through line 158 and 172 to a summing junction 162, this signal is applied in d.c. coupling fashion through resistor 164, located within line 166 and, simultaneously, in differentiating fashion through capacitor 168 and resistor 170, the latter network being associated in parallel circuit relationship with resistor 164. The dual form of output present at line 172 includes both direct, d.c. coupling output through resistor 164 as well as a damping term or anticipatory signal through capacitor 168 and resistor 170 which provides a form of anticipation of the signal serving to avoid hunting phenomena and the like within the system.

The error signal of value, $V_C$, is introduced through line 66 and resistor 174 to summing junction 162. This signal is selected as of opposite polarity to the signal presented from line 172 to the junction 162 and the summed signal is introduced to the inverting input of a single ended input amplifier 176. The opposite or non-inverting input to amplifier 176 is coupled to reference through line 178 and bias resistor 180. Amplifier 176 incorporates a feedback loop comprising line 182 incorporating a feedback resistor 184, the latter resistor establishing the gain of the amplifier in conventional fashion. The amplifier additionally is coupled to the voltage or power source through line 186 and to ground through line 188, while its output is presented at line 190. This output, representing an error signal or voltage, is d.c. coupled to a power amplifier network represented generally at 192. Network 192 comprises two, push-pull, amplification stages revealed generally at 194 and 196. Accordingly, the error signal from line 190 is introduced from line 198 through input resistor 200 to one input of an operational amplifier 202. The opposite input to amplifier 202 is coupled to reference through line 204 and bias resistor 206, while the output thereof is presented along line 208 to the input of a follower, power amplifier stage 210. Amplifiers 202 and 210 are connected to ground through line 212 and to power supply voltage through line 214. A feedback line 216 extends from the output of amplifier 210 at line 152 to input line 198 and incorporates a feedback resistor 218. As is apparent, the gain of stage 194 is established by the related values assigned to resistors 218 and 200.

Looking to stage 196, the error signal input at line 198 is introduced to the non-inverting input of operational amplifier 220 while the inverting input thereto is coupled through line 222 and resistor 224 to reference. The output of amplifier 220 is present at line 226, which, in turn, is coupled with the input of power amplification stage 228. The output of amplification stage 228 is present at line 150 and is coupled through line 230 and feedback resistor 232 to input line 222. As provided instage 194, power input to amplifiers 220 and 228 is supplied from a high voltage tap through line 234, while the amplifiers are coupled to ground through line 236. As is apparent from the foregoing description, any error signal introduced at line 190 is asserted upon servo or d.c. motor 114 in push-pull fashion to carry out a correction command by manipulation of tactile slide 106. Resultant movement of yoke 102 provides an alteration in aircraft attitude to alter the input at line 66 to the system. This correction, in turn, causes motor 114 to be energized appropriately thereby introducing a feedback signal through line 158 to summing junction 162. In the course of this correction, a null position ultimately may be achieved and the tactile slide 106 assumes a position flush within housing 108 to apprise the pilot that a correct aircraft attitude has been achieved.

Display function 68 also may incorporate a failure indication feature represented by block 240 which is connected with output line 190 of amplifier 176. The error signal at line 190 will assume either positive or negative polarity in dependence upon the direction of correction indicated. Function 240 incorporates an absolute value network which monitors this signal, converting it to a signal of singular polarity. Should correction not be asserted by the pilot, this absolute value will reach a peak and through comparator or trip reference networks, the indicator function 240 them may sound an audibly, visibly or other perceptible alarm. Additionally, should spurious signals and the like develop within function 68, their absolute value will build and be monitored through line 242 to apprise the pilot that the readout system is not functioning correctly. As is apparent, a variety of circuits are readily derived for function 240, i.e., such circuits may observe peak absolute values or may provide for the integration of these signals and assert such integrated signals at the input of a threshold responsive subcircuit which will trigger the noted alarm.

Figure 8:
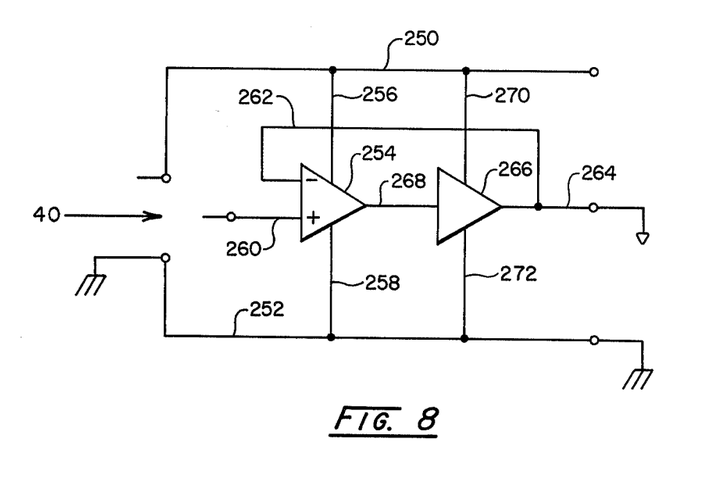
FIG. 8 is a schematic circuit diagram of a power supply splitter network utilized with the system of the invention.

Looking to FIG. 8, a power supply splitter network is shown which may be utilized to derive the noted power, reference and ground couplings for the circuit of function 68. In this regard, power leads 250 and 252 are coupled across the aircraft power supply and serve to the upper level of voltage input and ground level for circuit 68. An operational amplifier 254 is coupled through respective lines 256 and 258 to lines 250 and 252. The non-inverting input to amplifier 254 is coupled through line 260 to the reference voltage of lift transducer 40 (FIG. 3). The opposite or inverting input to amplifier 254 is coupled through line 262 to the output line 264 of power amplifier 266. The input of amplifier 266 is coupled through line 268 to the output of amplifier 254, while the amplifier is connected to power leads 250 and 252 through respective lines 270 and 272. Thus connected, the output at line 264 represents a reference voltage operatively associated with the reference voltage of the lift transducer and representing a voltage value intermediate between the voltage across lines 250 and 252.

In the course of typical operation, the control system of the invention operates as follows: for typical takeoffs and departures, the control system is activated in conjunction with the activation of the power system of the aircraft. As the aircraft is taxied to the runway and engine power for take-off is applied, the aircraft commences to move forwardly developing and increasing air speed. When this speed reaches a range of about ten to thirty miles per hour enough air pressure is created to move the lift transducer. Correspondingly, the tactile slide 106 will be activated to move rearwardly towards the palm of the pilot's hand thereby commanding him to move yoke 102 rearwardly. The nose wheel of the aircraft will tend to rise for lift-off, after which, the command signal, $V_C$, will be of an order gradually commanding the pilot to move the yoke 102 forwardly to gradually lessen the pitch attitude of the aircraft. This is in keeping with proper departure procedures and provides for desired performance of the aircraft with respect to coefficient of lift. Note that from the point of lift-off to the predetermined altitude having the designated value, A, the command signal will incorporate the above-described altitude responsive input, (A-$h$). As the aircraft reaches an altitude of the designated value, A, for instance about 50 feet, relay 78 is activated to open switch 80 and remove signal inputs to line 70. Accordingly, the command signal, $V_C$, now represents a predetermined constant input of value, $V_D$, compared with actual coefficient of lift value or stagnation point position represented by the signal of value, $V_A$. This input continues until the aircraft reaches cruise altitude from which point the control system is disregarded or automatically disengaged, it being desired now to control the aircraft attitude to achieve maximum L/D ratio conditions.

As the aircraft commences to land, and the downwind leg is flown, the control system of the invention again is re-engaged. During initial downwind approach, the command signal of value, $V_C$, is again that relating the difference between actual coefficient of lift value or stagnation point position of value, $V_A$, with respect to desired attitude having a signal input of value, $V_D$. As the aircraft reaches the point of commencing flare-out procedures, i.e., at an altitude at the predetermined value, A, or about 50 feet, relay 78 is activated to close switch 80 and insert the altitude responsive signal of value (A-$h$) at line 70. Tactual slide 106 now is driven to command the pilot to draw back on yoke 102 in progressive fashion until a near stall condition is achieved simultaneously with touchdown.

Since certain changes may be made in the above-described system and apparatus without departing from the scope of the invention herein involved, it is intended that all matter contained in the above description or shown in the accompanying drawings shall be interpreted as illustrative and not in a limiting sense.

What is claimed is:

1. A flight control system for providing a command perceptible to a pilot representing control correction required to derive an optimum attitude for an aircraft, comprising:

transducer means responsive to the instantaneous aerodynamic status of the airfoil exhibited by said aircraft for deriving an output signal, $V_A$, corresponding with the instantaneous coefficient of lift exhibited by said airfoil;

first signal generator means for deriving a signal of fixed value, $V_D$, proportional with a coefficient of lift for said airfoil predetermined to be desired for performance of said aircraft during approach to flare-out and departure maneuvers;

altimeter means having an output signal of value, $h$, variable in correspondence with the absolute altitude of said aircraft;

second signal generator means for deriving a predetermined signal of fixed value, A, corresponding with a said altitude selected for commencing flare-out performance of said aircraft;

first summing network means coupled to receive said predetermined signal of value, A, and said altimeter output signal of value, $h$, for deriving an altitude responsive output signal of value corresponding with the expression, A-$h$, only when said aircraft is at or below said altitude corresponding with said signal of value, A, second summing network means responsive to said transducer means output signal value, $V_A$, and said first signal generator means signal of value, $V_D$, when said aircraft is above a said altitude corresponding with said signal of value, A, and for deriving a control error signal therefrom of value, $V_C$, in correspondence with the expression:

$$V_C = V_D - V_A,$$

said second summing network means additionally being responsive to said first summing network output signal of value, A-$h$, when said aircraft is at or below said altitude corresponding with said signal of value, A, for deriving said control error signal in correspondence with the expression:

$$V_C = V_D - V_A + (A-h)\beta,$$

where, $\beta$, is an empirically determined calibrating constant; and display means responsive to said control error signal to provide a perceptible indication of correction required for establishing an optimum attitude for said aircraft.

2. The flight control system of claim 1 in which said display means comprises a kinesthetic-tactile control component including:

a control housing having opposed surface portions adapted to be gripped by the hand of said pilot;

a tactile slide actuable to move outwardly from a said surface to exert a tactile, information conveying effect upon a portion of said hand; and     drive means energizable in response to said control error signal of value, $V_C$, for actuating said tactile slide to move outwardly a distance correspondent with said value $V_C$.

3. The flight control system of claim 2 in which said drive means is energizable to effect movement of said tactile slide in a direction toward the index finger of said hand when said control error signal represents a command to lessen the angle-of-attack of said airfoil, and is energizable to effect movement of said tactile slide in an opposite said direction when said control error signal represents a command to increase the said angle-of-attack of said airfoil.

4. The flight control system of claim 2 in which said control housing is coupled with the manually engaged elevator control component of said aircraft.

5. The flight control system of claim 4 in which said drive means is energizable to effect movement of said tactile slide codirectionally with that movement of said control component representing compliance with a control command corresponding with said control error signal.

6. The flight control system of claim 1 wherein said first signal generator means signal of value, $V_D$, corresponds with a coefficient of lift for said aircraft airfoil having a value of about two thirds of the value of coefficient of lift representing an incipient stall condition thereof.

7. The flight control system of claim 1 including means responsive to said altimeter means output having a value less than or equal to said value, A, for effecting the assertion at said second summing network means of said first summing network means output signal of value corresponding with the expression, $A\text{-}h$.

8. The flight control system of claim 1 wherein said first summing network means output signal of value corresponding with the expression, $A\text{-}h$, and said first signal generator means signal of value, $V_D$, are of the same polarity and of opposite polarity with respect to said sensor-transducer means output of value, $V_A$.

9. A flight control system for providing a command perceptible to a pilot representing control correction required to derive an optimum attitude for an aircraft, comprising:

transducer means responsive to the instantaneous aerodynamic status of the airfoil exhibited by said aircraft for deriving an output signal, $V_A$, corresponding with the instantaneous angle of attack and coefficient of lift exhibited by said airfoil;

first signal generator means for deriving a signal of fixed value, $V_D$, corresponding with an angle-of-attack and coefficient of lift for said airfoil predetermined to be desired for performance of said aircraft during approach to flare-out and departure maneuvers;

altimeter means having an output signal of value, $h$, variable in correspondence with the absolute altitude of said aircraft;

second signal generator means for deriving a predetermined signal of fixed value, A, corresponding with a said altitude selected for commencing flare-out performance of said aircraft;

first summing network means coupled to receive said predetermined signal of value, A, and said altimeter output signal of value, $h$, for deriving an altitude responsive output signal of value corresponding with the expression, $A\text{-}h$, when said aircraft is at or below said altitude corresponding with said signal of value, A;

second summing network means responsive to said transducer means output signal value, $V_A$, and said first signal generator means signal of value, $V_D$, when said aircraft is above a said altitude corresponding with said signal of value, A, and for deriving a control error signal therefrom of value, $V_C$, in correspondence with the expression:

$$V_C = V_D - V_A,$$

said second summing network output means additionally being responsive to said first summing network signal of value, $A\text{-}h$, when said aircraft is at or below said altitude corresponding with said signal of value, A, for deriving said control error signal in correspondence with the expression:

$$V_C = V_D - V_A + (A-h)\beta,$$

where, $\beta$, is an empirically determined calibrating constant;

a control housing having opposed surface portions adapated to be gripped by a hand of the pilot of said aircraft;

a tactile slide moveably mounted within said control housing and actuable to move outwardly from a position flush with one of said surfaces to exert a perceptible tactile effect upon a portion of said hand;

d.c. servo-motor means having an output connected for actuating said tactile slide when energized;

potentiometer means having an output corresponding to the position of said tactile slide with respect to said control housing; and     control circuit means including an input summing stage for receiving said potentiometer output and said second summing network means control error signal, $V_C$, and deriving a difference signal therefrom, and means for selectively energizing said d.c. servo-motor means in correspondence with said difference signal.

10. The flight control system of claim 9 in which said control housing is coupled with the manually engaged elevator control component of said aircraft.

11. The flight control system of claim 10 in which said drive means is energizable to effect movement of said tactile slide codirectionally with that movement of said control component representing compliance with a control command corresponding with said control error signal.

12. The flight control system of claim 9 in which:
said control circuit means includes feedback network means connecting said potentiometer means output with said input summing stage, said feedback network means being configured for simultaneously asserting said potentiometer output through a d.c. coupling and a differentiating network at said input summing stage.

13. The flight control system of claim 9 wherein:
said control circuit means includes an amplification stage coupled to receive said input summing stage difference signal and deriving an error signal in response thereto; and
including failure indicator means responsive to the absolute value of said error signal for generating a perceptible warning signal when said absolute value exceeds a predetermined threshold value.

14. A flight control system for providing a command representing correction required to derive an optimum attitude for an aircraft, comprising:
sensor-transducer means situate in the vicinity of a leading edge of a wing airfoil of said aircraft and having an output of value, $V_A$, corresponding with the site of the stagnation point aerodynamically generated upon said airfoil;
first signal generator means for deriving a signal of value, $V_D$, representative of a predetermined site of said stagnation point representing a lift condition predetermined for desired performance of said aircraft during approach to flare-out and departure maneuvers;
altimeter means having an output signal of value, $h$, variable in correspondence with the absolute altitude of said aircraft;
second signal generator means for deriving a predetermined signal of fixed value, A, corresponding with a said altitude selected for commencing flare-out performance of said aircraft;
first summing network means coupled to receive said predetermined signal of value, A, and said altimeter output signal of value, $h$, for deriving an altitude responsive output signal of value corresponding with the expression, A-$h$, only when said aircraft is at or below said altitude corresponding with said signal of value, A;
second summing network means responsive to said sensor-transducer means output signal of value, $V_A$, and said first signal generator means signal of value, $V_D$, when said aircraft is above a said altitude corresponding with said signal of value, A, and for deriving a control error signal therefrom of value, $V_C$, in correspondence with the expression:

$$V_C = V_D - V_A,$$

said second summing network means additionally being responsive to said first summing network output signal of value, A-$h$, when said aircraft is at or below said altitude corresponding with said signal of value, A, for deriving said control error signal in correspondence with the expression:

$$V_C = V_D - V_A + (A-h)\beta,$$

where $\beta$, is empirically determined calibrating constant; and
display means responsive to said control error signal to provide a perceptible indication of correction required for establishing an optimum attitude for said aircraft.

15. The flight control system of claim 14 in which said display means include: a kinesthetic-tactile control component comprising:
a control housing having opposed surface portions adopted to be gripped by the hand of the pilot of said aircraft, a tactile slide actuable to move outwardly from a said surface to exert a tactile effect upon a portion of said hand; and
drive means energizable in correspondence with said control error signal of value, $V_C$, for actuating said tactile slide.

16. The flight control system of claim 15 in which said drive means is energizable to effect movement of said tactile slide in a direction toward the index finger of said hand when said control error signal represents a command to lessen the angle-of-attack of said airfoil, and is energizable to effect movement of said tactile slide in an opposite said direction when said control error signal represents a command to increase the said angle-of-attack of said airfoil.

17. The flight control system of claim 15 in which said control housing is coupled with the manually engaged elevator control component of said aircraft.

18. The flight control system of claim 17 in which said drive means is energizable to effect movement of said tactile slide codirectionally with that movement of said control component representing compliance with a control command corresponding with said control error signal.

19. The flight control system of claim 14 wherein said first signal generator means signal of value, $V_D$, corresponds with a said stagnation point situs representing a coefficient of lift for said airfoil having a value of about two thirds of the value of coefficient of lift representing an incipient stall condition thereof.

20. The flight control system of claim 14 including means responsive to said altimeter means output having a value less than or equal to said value, A, for effecting the assertion at said second summing network means of said first summing network means output signal of value corresponding with the expression, A-$h$.

21. The flight control system of claim 20 wherein said first signal generator means signal of value, $V_D$, corresponds with a said stagnation point situs representing a coefficient of lift for said airfoil having a value of about two thirds of the value of coefficient of lift representing an incipient stall condition thereof.

22. The flight control system of claim 14 wherein said first summing network means output signal of value corresponding with the expression, A-$h$, and said first signal generator means signal of value, $V_D$, are of the same polarity and of opposite polarity with respect to said sensor-transducer means output of value, $V_A$.

23. The flight control system of claim 14 in which said display means comprises:
a control housing having opposed surface portions adopted to be gripped by a hand of the pilot of said aircraft;
a tactile slide moveably mounted within said control housing and actuable to move outwardly from one of said surfaces to exert a perceptible tactile effect upon a portion of said hand;
d.c. servo-motor means having an output connected for actuating said tactile slide when energized;

potentiometer means having an output corresponding to the position of said tactile slide with respect to said control housing; and control circuit means including an input summing stage for receiving said potentiometer output and said second summing network means control error signal and deriving a difference signal therefrom, and means for selectively energizing said d.c. servo-motor means in correspondence with said difference signal.

24. A flight control system for providing a command representing correction required to derive an optimum attitude for an aircraft, comprising:

sensor-transducer means situate in the vicinity of a leading edge of a wing airfoil of said aircraft and having an output of value, $V_A$, corresponding with the site of the stagnation point aerodynamically generated upon said airfoil;

first signal generator means for deriving a signal of value, $V_D$, corresponding with a predetermined site of said stagnation point representing a lift condition predetermined for desired performance of said aircraft during approach to flare-out and departure maneuvers;

altimeter means having an output signal of value, $h$, variable in correspondence with the absolute altitude of said aircraft;

second signal generator means for deriving a predetermined signal of fixed value, A, corresponding with a said altitude selected for commencing flare-out performance of said aircraft;

first summing network means coupled to receive said predetermined signal of value, A, and said altimeter output signal of value, $h$, for deriving an altitude responsive output signal of value corresponding with the expression, A-$h$, when said aircraft is at or below said altitude corresponding with said signal of value, A;

second summing network means responsive to said sensor-transducer means output signal of value, $V_A$, and said first signal generator means signal of value, $V_D$, when said aircraft is above a said altitude corresponding with said signal of value, A, and for deriving a control error signal therefrom of value, $V_C$, in correspondence with the expression:

$$V_C = V_D - V_A,$$

said second summing network means additionally being responsive to said first summing network output signal of value, A-$h$, when said aircraft is at or below said altitude corresponding with said signal of value, A, for deriving said control error signal in correspondence with the expression:

$$V_C = V_D - V_A + (A-h)\beta,$$

where, $\beta$, is empirically determined calibrating constant;

a control housing having opposed surface portions adopted to be gripped by a hand of the pilot of said aircraft;

a tactile slide moveably mounted within said control housing and actuable to move outwardly from one of said surfaces to exert a perceptible tactile effect upon a portion of said hand;

d.c. servo-motor means having an output connected for actuating said tactile slide when energized;

potentiometer means having an output corresponding to the position of said tactile slide with respect to said control housing; and control circuit means including an input summing stage for receiving said potentiometer output and said second summing network means control error signal and deriving a difference signal therefrom, means for selectively energizing said d.c. servo-motor means in correspondence with said difference signal, and feedback network means connecting said potentiometer means output with said input summing stage, said feedback network means simultaneously asserting said potentiometer output through a d.c. coupling and a differentiating network at said input summing stage.

25. A flight control system for providing a command representing correction required to derive an optimum attitude for an aircraft, comprising:

sensor-transducer means situate in the vicinity of a leading edge of a wing airfoil of said aircraft and having an output of value, $V_A$, corresponding with the site of the stagnation point aerodynamically generated upon said airfoil;

first signal generator means for deriving a signal of value, $V_D$, corresponding with a predetermined site of said stagnation point representing a lift condition predetermined for desired performance of said aircraft during approach to flare-out and departure maneuvers;

altimeter means having an output signal of value, $h$, variable in correspondence with the absolute altitude of said aircraft;

second signal generator means for deriving a predetermined signal of fixed value, A, corresponding with a said altitude selected for commencing flare-out performance of said aircraft;

first summing network means coupled to receive said predetermined signal of value, A, and said altimeter output signal of value, $h$, for deriving an altitude responsive output signal of value corresponding with the expression, A-$h$, when said aircraft is at or below said altitude corresponding with said signal of value, A, second summing network means responsive to said sensor-transducer means output signal of value, $V_A$, and said first signal generator means signal of value, $V_D$ when said aircraft is above a said altitude corresponding with said signal of value, A, and for deriving a control error signal therefrom of value, $V_C$, in correspondence with the expression:

$$V_C = V_D - V_A,$$

said second summing network means additionally being responsive to said first summing network output signal of value, A-$h$, when said aircraft is at or below said altitude corresponding with said signal of value, A, for deriving said control error signal in correspondence with the expression:

$$V_C = V_D - V_A + (A-h)\beta,$$

where, $\beta$, is empirically determined calibrating constant;

a control housing having opposed surface portions adopted to be gripped by a hand of the pilot of said aircraft;

a tactile slide moveably mounted within said control housing and actuable to move outwardly from one of said surfaces to exert a perceptible tactile effect upon a portion of said hand;

d.c. servo-motor means having an output connected for actuating said tactile slide when energized;

potentiometer means having an output corresponding to the position of said tactile slide with respect to said control housing; and control circuit means including an input summing stage for receiving said potentiometer output and said second summing network means control error signal and deriving a difference signal therefrom, means for selectively energizing said d.c. servo-motor means in correspondence with said difference signal, and an amplification stage coupled to receive said input summing stage difference signal and deriving an error signal in response thereto; and including failure indicator means responsive to the absolute value of said error signal for generating a perceptible warning signal when said absolute value exceeds a predetermined threshold.

* * * * *